Figure 1:
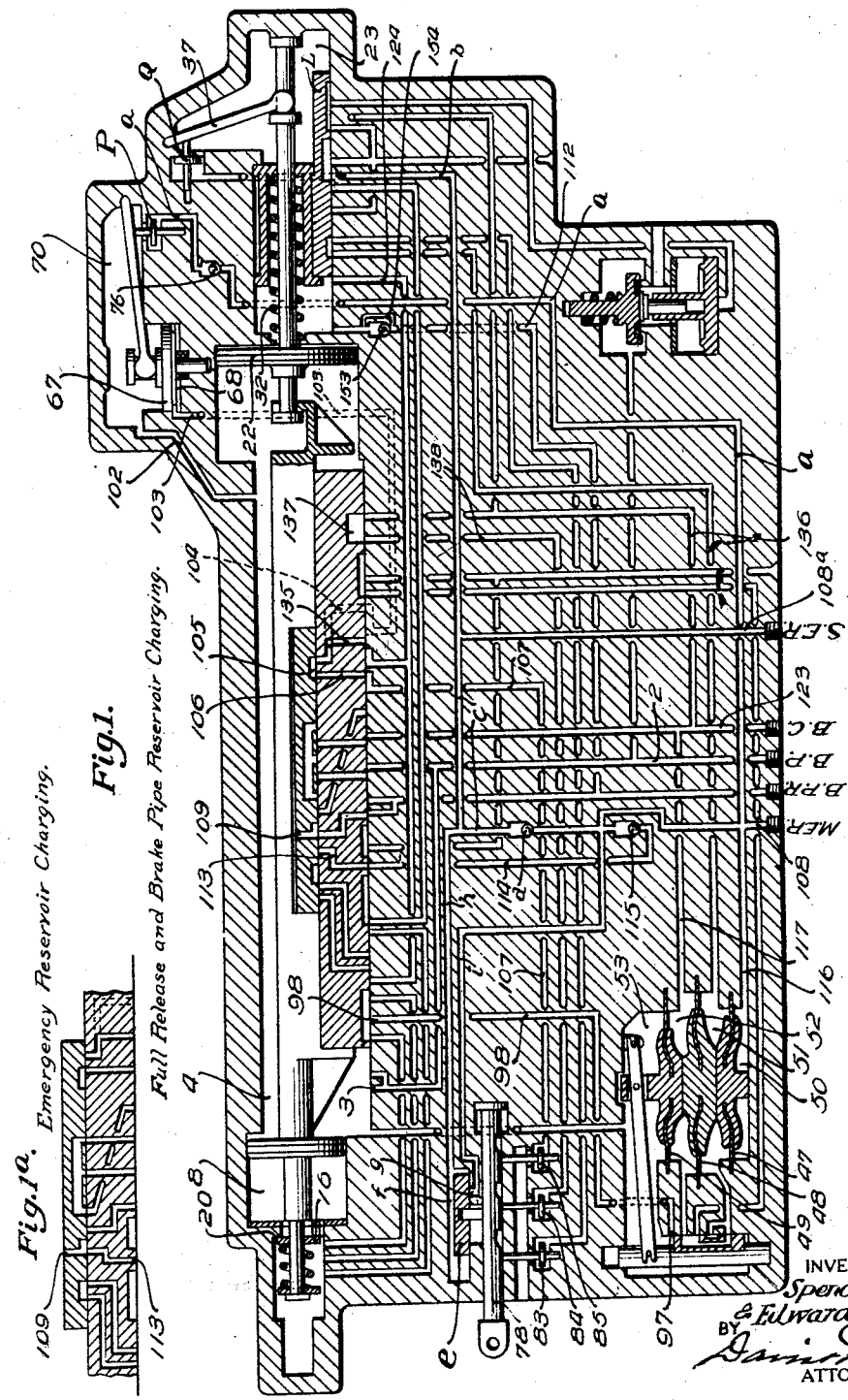

Sept. 28, 1926.

S. G. NEAL ET AL 1,601,577

AIR BRAKE APPARATUS

Filed Oct. 1, 1924

3 Sheets-Sheet 2

Fig. 2.
Emergency Position.

INVENTORS
Spencer G. Neal
& Edward P. Wilson
BY
ATTORNEYS

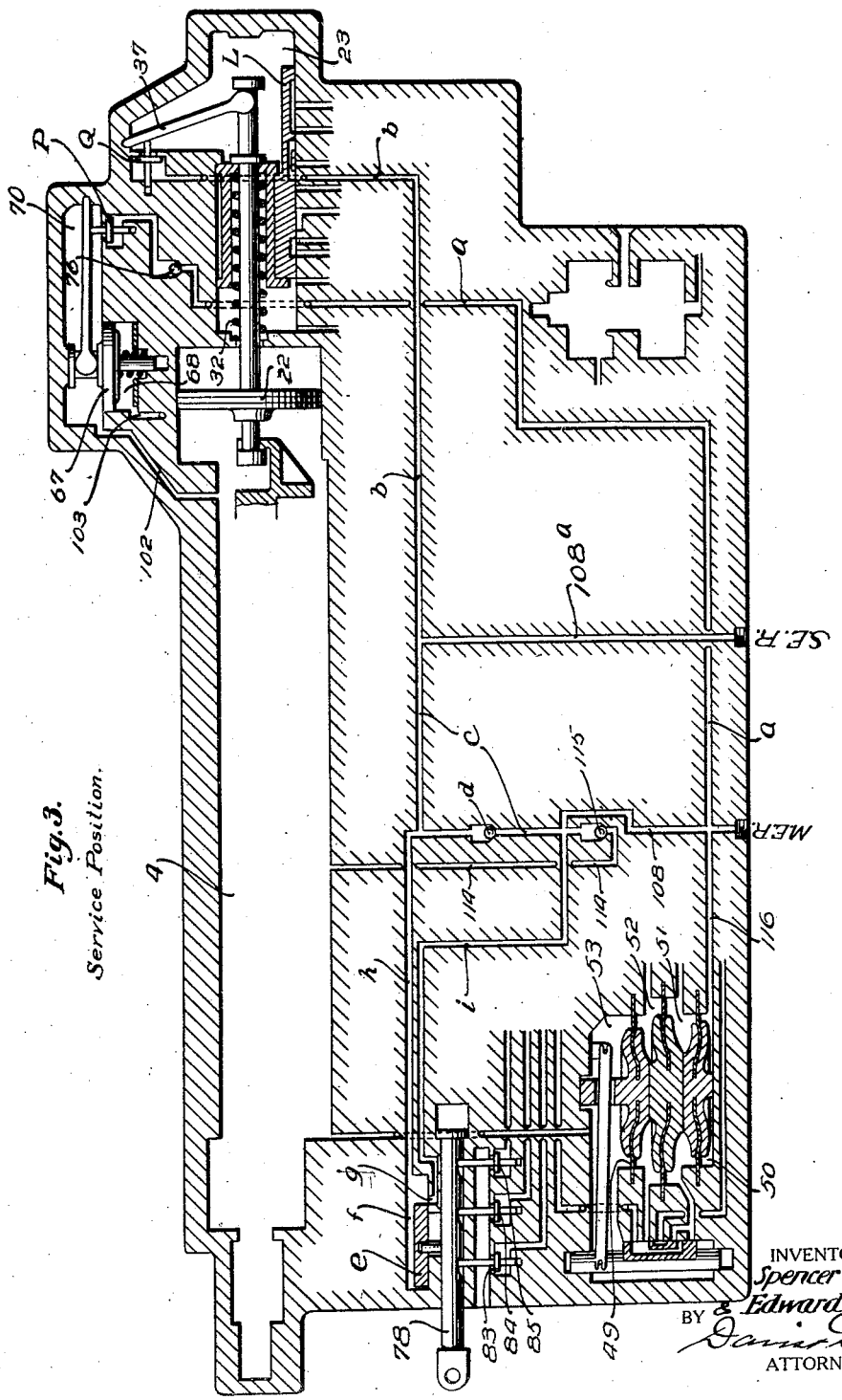

Patented Sept. 28, 1926.

1,601,577

UNITED STATES PATENT OFFICE.

SPENCER G. NEAL, OF NEW YORK, N. Y., AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

AIR-BRAKE APPARATUS.

Application filed October 1, 1924. Serial No. 740,959.

This invention relates to improvements in that type of air brake apparatus disclosed in Patent No. 1,502,521 dated July 22, 1924. In the apparatus disclosed in the said patent the brake pipe volume is augmented by a brake pipe reservoir, air from said reservoir passing to the brake cylinder with air from the brake pipe during all service applications of the brakes. It is a further characteristic of the apparatus disclosed in said patent that the brake cylinder pressure controls the movement of the triple valve to lap position so that brake cylinder pressure will be built up to the desired degree without regard to the length of piston travel or brake cylinder leaks. Another characteristic of the apparatus disclosed in said patent is that an emergency reservoir is employed, the air from said emergency reservoir passing to the brake cylinder in emergency applications of the brakes and passing to the brake pipe for a quick release of the brakes, when the triple valve is adjusted for quick release operations.

The principal object of this invention is to provide a supplemental emergency reservoir in addition to the main emergency reservoir and to provide means whereby, when the triple valve is adjusted for quick release operations, the air from the main emergency reservoir will flow to the brake pipe, the other or supplemental reservoir being sealed during the quick release operations. It is a further object of this invention to so construct the triple valve that in emergency applications of the brakes both of the emergency reservoirs will be connected to the brake cylinder.

One of the purposes of the invention is to provide an air brake apparatus in which an effective pressure may be obtained in the brake cylinder at all times even immediately following a quick release of the brakes.

Another object of the invention is to provide means whereby when the triple valve is adjusted for graduated release operations both the main and supplemental emergency reservoirs will be connected together and will function as a single reservoir of large capacity.

The triple valve shown in the drawings and described herein is constructed as shown in the aforesaid patent and operates in precisely the same manner except for the slight modifications thereof described herein. It is therefore thought to be unnecessary to fully describe the construction and operation of the triple valve. The new features will be described herein together with such portions of the triple valve as may be necessary for a complete understanding of the invention.

In the drawings, Fig. 1 is a diagrammatic view of a triple valve embodying the invention and showing the parts of the triple valve in full release and brake pipe reservoir charging position, the release governing valve being in quick release position;

Fig. 1ᵃ a diagrammatic view of the main slide valve and graduating valve with the graduating valve in emergency reservoir charging position.

Fig. 2 a diagrammatic view similar to Fig. 1 showing the triple valve in emergency position; and Fig. 3 a diagrammatic view showing the triple valve parts in service position with the release governing valve in graduated release position.

The main emergency reservoir passage 108 is connected by a passage $a$ to the chamber in which is arranged the quick release valve P. In the passage $a$ is arranged the back pressure check valve 76. This valve, as fully described in the aforesaid patent, prevents the charging of the main emergency reservoir through the quick release valve and the quick release valve chamber.

The supplemental emergency reservoir passage 108ᵃ is connected by passage $b$ to the chamber in which is arranged the emergency reservoir valve Q. The passage $b$ is connected to the main emergency reservoir passage 108 by a passage $c$ in which is arranged a check valve $d$. The valve $d$ is so arranged that air cannot flow from the supplemental emergency reservoir into the main emergency reservoir passage 108. In the emergency application of the brakes air from the main emergency reservoir will unseat check valve $d$ and flow through passage $b$ together with air from the supplemental emergency reservoir to the brake cylinder, as will be hereinafter described.

The emergency reservoir charging passage 114 is connected to the passage 108 and in said charging passage is arranged the charging check valve 115. The valve 115 will be unseated during the charging operation. The check valve d will also be unseated during the charging operation and thereby permit air to flow from passage 108 into passage c and thence through passage 108ª to the supplemental emergency reservoir. The main emergency reservoir passage 108 is connected directly to the emergency reservoir chamber 50 of the pilot valve structure by passage 116.

The release governing valve rod 78 carries a small slide valve e which operates in a valve chamber f. The valve e, when the release governing valve stem is in graduated release position, as illustrated in Fig. 3, uncovers a port g which opens into the chamber f. When the release governing valve stem is in quick release position, as illustrated in Figs. 1 and 2, the port g is closed by the valve e. The chamber f is connected to the passage c on one side of the check valve d by a passage h and the port g is connected to said passage c on the other side of the check valve d by a passage i. The passages h and i serve as a by-pass around the valve d and this by-pass is controlled, that is to say is opened or closed, by the valve e. When the release governing valve is in graduated release position the port g is open and there is clear communication between the supplemental emergency reservoir and the main emergency reservoir around the valve d. When the release governing valve is in quick release position the by-pass passages h and i are closed and air from the supplemental emergency reservoir cannot flow past valve d to the main emergency reservoir passage.

It is to be noted that the supplemental emergency reservoir is cut off from the quick release passage a when the release governing valve is in quick release position. This prevents the supplemental emergency air passing to the brake pipe in quick release operations. When the quick release valve is in graduated release position the supplemental emergency reservoir is in direct open communication with the passage 108 and both the emergency reservoirs are open to chamber 50 of the pilot valve structure.

The brake pipe reservoir charging operation is precisely as described in the aforesaid Patent No. 1,502,521. When the graduated valve is moved to emergency reservoir charging position as shown in Fig. 1ª the main emergency reservoir will be charged precisely as described in the aforesaid patent, air passing from chamber 4 down through passage 109 in the graduating valve passage 113 in the main slide valve, charging passage 114, past check valve 115 into passage 108 and to the main emergency reservoir. Air will also pass up through passage c past check valve d and through passage 108ª to the supplemental emergency reservoir so that both the main and supplemental emergency reservoirs will be charged when the graduating valve is in emergency reservoir charging position.

The service operation and the service lap operations of the triple valve are precisely as described in the aforesaid patent. The release operation of the triple valve while operating in quick release position is as follows:

*Release while operating in quick release position.*

To adjust the triple valve for quick release operations the release governing valve stem 78 is moved to the right or inward, to open valves 83, 84 and 85 and to close port g. By closing port g the by-pass around check valve d is closed (Figs. 1 and 2).

To effect a release of the brakes, the brake pipe pressure is increased in the usual manner, which will result in a corresponding increase in pressure in chambers 4 and 53. The increase of brake pipe pressure in chamber 53 operates the pilot valve to release position, thereby admitting brake pipe pressure through passage 98 to chamber 8, and the increase in pressure in chamber 4 above that in the chamber 23, which is at this time sealed from the brake pipe by the main slide valve, operates the main slide valve toward release position. The main slide valve can operate toward release position without any spring resistance until the graduating spring washer 16 engages the shoulder 20. During this movement, the brake pipe reservoir pressure in chamber 23 is released to atmosphere in an amount that will cause a sufficient differential of pressure between the increasing brake pipe pressure in chamber 4 and the decreasing brake pipe reservoir pressure in chamber 23 to positively operate the triple valve to release position. The communication between chamber 23 and the atmosphere is as follows: passage 124 of the valve body, passage 135 of the main slide valve, cavity 105 of the graduating valve, passage 106 of the main slide valve, and through passage 107 to the atmosphere, the valve 85 when operating in quick release being open. In service lap position, the passage 106 in the main slide valve is out of communication with passage 107, (see Patent No. 1,502,521), but when this free movement above referred to takes place, communication is established between passages 106 and 107. This reduction of pressure between the chamber 23 and the atmosphere likewise takes place in chamber 68 beneath the quick release piston 67, through ports and passages 103, 104, 105, 106, and 107, with the result that this piston will assume the position shown in Fig. 1, which will open the quick release valve P. The operation of valve P permits the release of the previously undisturbed main emergency reservoir pressure to chamber 4, by way of passage *a*, chamber 70 and passage 102, for the purpose of increasing the pressure in chamber 4 to positively operate the parts of the triple valve to full release position. From chamber 4 the high pressure air flows to the brake pipe through port 3 and passage 2. In release position the brake cylinder pressure is exhausted to atmosphere through passage 123, passage 136, cavity 137 of the main slide valve, through passage 138 of the valve body and past the quick release valve 84 (see Fig. 1). While in release position as above described, the system will be charged. The air in the supplemental emergency reservoir is held by the check valve *d* and cannot flow to the brake pipe in quick release operations.

Graduated release operation.

The present triple valve is designed to be operated in graduated release in grade braking where retainers are now used with Westinghouse equipment. To accomplish this result the operating stem 78 which controls the release governing check valves 83, 84 and 85 is manually operated to the left, (Fig. 3) this position permitting the guide stems of these valves to enter the recesses in stem 78. The closing of valve 85 prevents the release of the brake pipe reservoir pressure in chamber 23 to atmosphere, and likewise the release of the pressure beneath the quick release piston 67. Check valve 84 prevents the release of the brake cylinder pressure by way of the main slide valve, the release of brake cylinder pressure being controlled entirely by the pilot valve when the triple valve is operating in graduated release position. When valve 83 is closed, the release of pressure to atmosphere from chamber 51 between diaphragms 47 and 48 is prevented. When stem 78 is moved to graduated release position, valve *e* uncovers port *g* and places the supplemental emergency reservoir in direct communication with the main emergency reservoir through the by-pass passage around the check valve *d*. Both of said reservoirs will be in open communication with chamber 50 of the pilot valve structure and the air in both reservoirs will be available for emergency application. A service application of the brakes when operating in graduated release position is accomplished by a service reduction in brake pipe pressure, precisely as described in Patent No. 1,502,521. The only functional difference in the operation of the triple valve when operated in graduated release as compared with quick release, is in the control of the brake cylinder pressure, particularly while releasing the brake cylinder pressure, and the maintenance of the main and supplemental emergency reservoir pressures during all positions of the triple valve other than emergency. When the brake pipe pressure is increased the emergency pressure is not released to the brake pipe, as when operating in quick release, but is sealed and maintained during all service operations.

Emergency position (Fig. 2).

To obtain an emergency application of the brakes a brake pipe reduction is made at an emergency rate through the engineer's brake valve. This rate of brake pipe reduction, registered in chamber 4, will deplete the pressure therein faster than it is possible to deplete the pressure in chamber 23. This difference in the rate of reduction of pressures in chambers 4 and 23 will establish a differential in pressure on both sides of piston 22 that will oppose the resistance of the emergency spring 32, and the piston 22 and the emergency slide valve L will be operated to the left toward emergency position, as shown in Fig. 2. When the piston 22 has moved only a short distance toward emergency position, the lever 37 will open the emergency reservoir valve Q. The opening of valve Q will admit the high emergency reservoir pressure from the main and supplemental emergency reservoirs to chamber 23 past check valve *d* located in passage *c*. The admission of this high emergency reservoir pressure to chamber 23 will further increase the pressure in said chamber above that in chamber 4, with the result that the piston 22 and the emergency slide valve L will be positively operated to emergency position, as shown in Figure 2. The pressure entering passage 150 from chamber 23 flows direct to the brake cylinder through passage 136 when the emergency slide valve is in emergency position. Emergency brake cylinder pressure is registered in chamber 4 through passage 136, chamber 4 being at this time out of communication with the brake pipe, as the brake pipe port 3 is covered by the main slide valve.

As set forth in Patent Number 1,502,521, under certain conditions, both the emergency reservoir and the brake pipe reservoir pressures would flow direct to the brake cylinder. This will be the case should the brake pipe reservoir pressure be higher than the developed emergency brake cylinder pressure. If an emergency application is made following a full service brake application when carrying 70 pounds initial pressure in the brake pipe, only the emergency reservoir pressure will flow to the brake cylinder because the developed brake cylinder pressure resulting from the release of the undisturbed emergency reservoir pressure to the brake cylinder will develop a pressure therein in excess of 50 pounds, which was the pressure in the brake pipe reservoir at the time the emergency application was made. To prevent the high emergency reservoir pressure in chamber 23 being released into the lower brake pipe reservoir pressure, a check valve 153 is provided in passage 112. Pressure in chamber 23 which is, after an emergency brake application, brake cylinder pressure, is however permitted to slowly equalize with the lower pressure in the brake pipe reservoir through the by-pass 154 around check valve 153.

From the foregoing it is clear that when the triple valve is operated in quick release only a part of the emergency air will be released to the brake pipe. It is also clear that for emergency applications of the brakes a very ample supply of high pressure air will be available to produce effective emergency brake cylinder pressure at all times. The two emergency reservoirs are provided in order that the entire supply of emergency air shall not be delivered into the brake pipe for quick release operations.

What we claim is:

1. A triple valve comprising main and graduating valves, a piston operatively connected to said valves and operating on an increase in brake pipe pressure to move said valves to release position, a main emergency reservoir connection, a supplemental reservoir connection, a quick release valve controlling communication between the emergency reservoir connection and brake pipe, means whereby when the main and graduating valves are in release position the quick release valve will be opened to permit the air from the main emergency reservoir to flow to the brake pipe, and means to seal the supplemental emergency reservoir to prevent air from said reservoir flowing to the brake pipe when the quick release valve is opened.

2. A triple valve in accordance with claim 1 combined with a manually operable release governing valve means for controlling the operation of the quick release valve.

3. A triple valve in accordance with claim 1 combined with an emergency reservoir valve and means whereby when the main slide valve is in emergency position the emergency reservoir valve will be opened, and means whereby when the emergency reservoir valve is opened the main and supplemental emergency reservoirs will be placed in communication with the brake cylinder for an emergency application of the brakes.

4. A triple valve in accordance with claim 1 combined with an emergency reservoir valve, means whereby when the main slide valve is in emergency position the emergency reservoir valve will be opened, means whereby when the emergency reservoir valve is opened the main and supplemental emergency reservoirs will be placed in communication with the brake cylinder for an emergency application of the brakes, and a check valve arranged between the main and supplemental reservoirs said check valve preventing the flow of supplemental emergency reservoir air to the main emergency reservoir but permitting the main emergency reservoir air to flow with the supplemental emergency reservoir air to the brake cylinder when the emergency reservoir valve is open.

5. A triple valve in accordance with claim 1 combined with a manually operable release governing valve means for controlling the operation of the quick release valve, and with a valve operatively connected to the release governing valve and controlling passages which connect the supplemental emergency reservoir to the main emergency reservoir whereby when the release governing valve is in graduated release position the said passages will be open and when the release governing valve is in quick release position the said passages will be closed.

In testimony whereof we hereunto affix our signatures this 26th day of September, 1924.

SPENCER G. NEAL.
EDWARD P. WILSON.